(12) United States Patent
Iwashita et al.

(10) Patent No.: US 7,657,356 B2
(45) Date of Patent: Feb. 2, 2010

(54) CONTROLLER

(75) Inventors: Yasusuke Iwashita, Fujiyoshida (JP);
Tadashi Okita, Fujiyoshida (JP);
Hiroyuki Kawamura, Yamanashi (JP);
Satoshi Ikai, Yamanashi (JP)

(73) Assignee: Fanuc, Ltd., Yamanashi (JP)

( * ) Notice: Subject to any disclaimer, the term of this patent is extended or adjusted under 35 U.S.C. 154(b) by 667 days.

(21) Appl. No.: 11/289,319

(22) Filed: Nov. 30, 2005

(65) Prior Publication Data
US 2006/0116786 A1 Jun. 1, 2006

(30) Foreign Application Priority Data
Nov. 30, 2004 (JP) ............................. 2004-346879

(51) Int. Cl.
*G06F 19/00* (2006.01)
(52) U.S. Cl. .............................. 701/50; 483/17; 483/30; 700/188
(58) Field of Classification Search .................... 701/1, 701/29, 36, 50; 483/16–19, 30, 38, 901; 83/57–67; 700/188
See application file for complete search history.

(56) References Cited

U.S. PATENT DOCUMENTS

| | | | |
|---|---|---|---|
| 4,651,073 A | | 3/1987 | Shimizu et al. |
| 5,249,118 A | * | 9/1993 | Smith .......................... 700/63 |
| 7,373,219 B2 | * | 5/2008 | Nowlin et al. ................ 700/245 |
| 7,421,321 B2 | * | 9/2008 | Breed et al. .................... 701/29 |

FOREIGN PATENT DOCUMENTS

| | | |
|---|---|---|
| DE | 1325497 | 8/1973 |
| JP | 6-91482 | 4/1994 |
| JP | 9-308297 | 11/1997 |
| JP | 10-143249 | 5/1998 |
| JP | 10-260734 | 9/1998 |
| JP | 2002-323913 | 11/2002 |

OTHER PUBLICATIONS

European Search Report, dated Sep. 18, 2006, for related European Patent Application No. EP 05257190.8-2206.
Office Action mailed on Nov. 4, 2008 and issued in corresponding Japanese Patent Application No. 2004-346879.

* cited by examiner

*Primary Examiner*—Richard M. Camby (57) ABSTRACT

An acceleration detection unit for detecting acceleration is mounted on a driven body. When a previous block is a positioning command, the system waits till the detected value of acceleration detected by the acceleration detection unit becomes equal to or less than a set value αs after the distribution of the movement command of the positioning command is ended. If the detected value of acceleration becomes equal to or less than the set value αs, the distribution of the movement command of the next block is started. Because the cutting feed, etc., is started after the detected value of acceleration has become equal to or less than the set value αs and the vibrations stopped, machining can be conducted with high accuracy.

12 Claims, 6 Drawing Sheets

CONTROLLER

BACKGROUND OF THE INVENTION

1. Field of the Invention

The present invention relates to a controller for controlling the position and/or speed of a driven body in a working machinery such as tool machinery.

2. Description of the Related Art

In working machinery such as tool machinery, machining is carried out by moving a tool relative to a work which is to be machined. In order to control the machining position or speed, the driven body (work, table with a work mounted thereon, or tool) is driven with a servo motor, and usually position feedback, speed feedback, and current feedback control is conducted to control the position or speed of the driven body.

Machining position, speed and machining torque are controlled by such feedback control of position, speed, and current, but when the speed and acceleration of the driven body change rapidly, vibrations sometime occur in the driven body due to such rapid changes. In particular, when positioning of the driven body to the machining position in working machinery is conducted by rapid feed, vibrations occur due to a rapid change in speed when the driven body is stopped, and if the machining operation such as cutting is started immediately after the positioning, the driven body (work, table, tool) is subjected to the next operation such as machining in a vibrating state, the next operation cannot be implemented with high accuracy, and if the next operation is cutting, then precision machining cannot be conducted. Furthermore, when the next operation after the positioning operation is a tool replacement operation, then the tool replacement cannot be implemented correctly if the driven body was caused to vibrate in the positioning operation.

Accordingly, when a transition is made from a positioning operation such as fast feed operation to a machining operation such as cutting, the next operation such as cutting is started after waiting for a preset waiting time after the positioning has been completed.

Furthermore, in a known configuration (see Japanese Patent Application Laid-open No. H6-91482), an acceleration sensor for detecting the acceleration of a driven body is provided, the signal from the acceleration sensor is deducted from the current command outputted by the speed feedback control, the current command of the current feedback control is corrected, and vibrations of the driven body are suppressed.

With the conventional method, in which when the next operation after the positioning operation of the driven body, such as fast feed, is a machining operation such as cutting or a tool replacement operation, a transition to the next operation of cutting or tool replacement is made after the vibrations calmed down and a stable state was assumed, the waiting time is difficult to set. If a long waiting time is set, the entire machining time increases. Conversely, if a short waiting time is set, the next operation of cutting or tool replacement is started, while the driven body (work, table, tool, etc.) still vibrates, and the desired machining accuracy or correct tool replacement cannot be attained. The optimum waiting time is, therefore, difficult to set.

When the speed is changed rapidly in the course of machining operation such as cutting, there is a risk of vibrations occurring in the driven body and decreasing the machining accuracy.

SUMMARY OF THE INVENTION

The present invention relates to a controller of a machining tool for controlling the position and/or speed of a driven body.

The controller in accordance with the present invention, in a first mode thereof, comprises detection means for detecting the position and/or speed of the driven body, acceleration detection means for detecting the acceleration of the driven body, and a stoppage determination processing unit for determining the stoppage of the driven body based on a detected value of acceleration detected by the acceleration detection means after completion of a positioning command to the driven body. The operation processing of the next command is carried out after the stoppage has been determined in the stoppage determination processing unit.

In the controller of this mode, the positioning command to the driven body may be taken as a positioning command based on a fast feed command, and the stoppage determination processing unit determines the stoppage of the driven body based on the detected value of acceleration detected by the acceleration detection means only after the fast feed command completion.

The stoppage determination processing unit may determine the stoppage when the absolute value of the detected value of acceleration becomes equal to or less than a preset value.

The operation processing of the next command may be an operation for cutting or an operation for cutting tool replacement.

The controller in accordance with the present invention, in a second mode thereof, comprises detection means for detecting the position and/or speed of the driven body, acceleration detection means for detecting the acceleration of the driven body, and change means for decreasing the variation ratio of a speed command to the driven body when the detected value of acceleration detected by the acceleration detection means becomes equal to or greater than a preset threshold.

The controller in accordance with the present invention, in a third mode thereof, comprises detection means for detecting the position and/or speed of the driven body, acceleration detection means for detecting the acceleration of the driven body, an evaluation processing unit for conducting the prescribed calculations for evaluating the vibration state of the driven body during acceleration or deceleration and within the preset time interval after the end of the acceleration or deceleration, and change means for decreasing the variation ratio of a speed command to the driven body based on the evaluation value calculated by the evaluation processing unit.

In the controller of this mode, a prescribed time interval that is set in advance from an acceleration or deceleration start may be employed, instead of during acceleration or deceleration and the preset time interval after the end of acceleration or deceleration.

Furthermore, the change means may reduce a speed command to the driven body, instead of decreasing the variation ratio of a speed command to the driven body.

The controller in accordance with the present invention, in a fourth mode thereof, comprises detection means for detecting the position and/or speed of the driven body, acceleration detection means for detecting the acceleration of the driven body, and change means for decreasing the variation ratio of a speed command to the driven body when the detected value of acceleration detected by the acceleration detection means becomes equal to or greater than a preset threshold during acceleration or deceleration and within the preset time interval after the end of the acceleration or deceleration.

In the controller of this mode, a prescribed time interval that is set in advance from an acceleration or deceleration start may be employed, instead of during acceleration or deceleration and the preset time interval after the end of the acceleration or deceleration.

Furthermore, the change means may decrease a speed command to the driven body, instead of decreasing the variation ratio of a speed command to the driven body.

The controller in accordance with the present invention, in a fifth mode thereof, comprises a controller of a machining tool for controlling the position and/or speed of a driven body, comprising position/speed detection means for detecting the position and/or speed of the driven body, acceleration detection means for detecting the acceleration of the driven body, and acceleration estimation means for obtaining an acceleration estimation value based on the detection value from the position/speed detection means, wherein the acceleration value estimated by the acceleration estimation means and the detected value of acceleration obtained from the acceleration detection means are compared with each other and when the absolute value of the difference therebetween is equal to or larger than a preset threshold the speed command or variation ratio of the speed command to the driven body is decreased.

In the controller of this mode, the acceleration estimation means may obtain an acceleration estimation value based on a speed command value, instead of the detection value from the means for detecting the position or speed of the driven body.

In accordance with the present invention, the stoppage of vibrations of the driven body is detected based on the detected value of acceleration detected with acceleration detection means after the positioning command is completed and the next operation of cutting or tool replacement is then started. Therefore, the waiting time to the start of the next operation of cutting or tool replacement after the positioning command is completed is a necessary and sufficient time, time loss is eliminated, and operation accuracy such as machining accuracy can be increased. Furthermore, changing the command speed or changing the variation ratio of the speed command so as to inhibit the vibrations of the driven body occurring as the speed changes during acceleration or deceleration makes it possible to suppress the vibrations of the driven body and to conduct more stable operation control.

BRIEF DESCRIPTION OF THE DRAWINGS

The above-described and other objects and features of the present invention will become clear from the following description of embodiments illustrated with reference to the appended drawings.

DETAILED DESCRIPTION OF THE PREFERRED EMBODIMENTS

The present invention will be explained below based on the examples of application thereof to a numerical controller as a controller of a machine tool.

Figure 1:
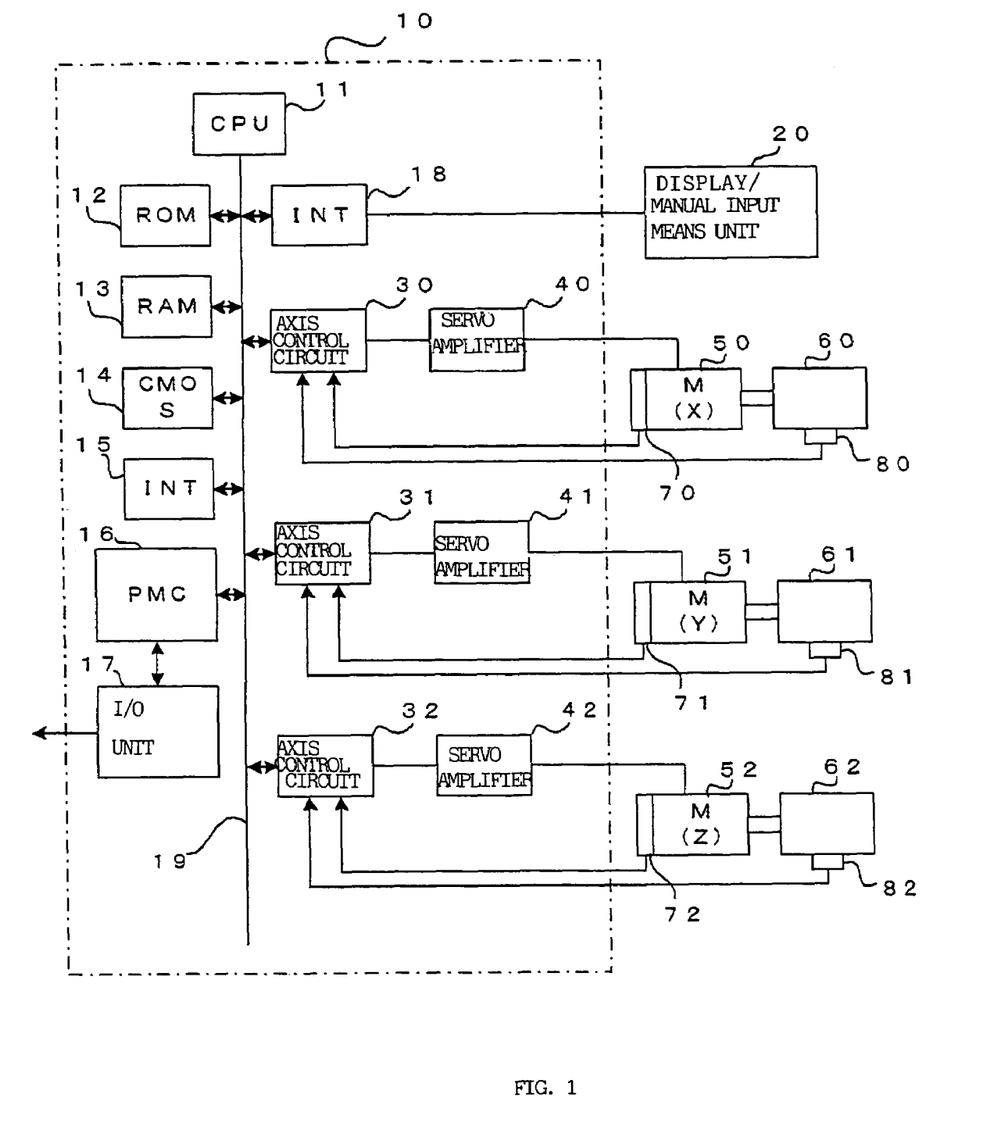
FIG. 1 is a block diagram of the main portion of the controller in accordance with the present invention.

FIG. 1 is a block diagram of the main portion of the controller in accordance with the present invention. A CPU 11 is a processor for controlling the entire controller 10 executing numerical control. The CPU 11 reads a system program stored in a ROM 12 via a bus 19 and controls the entire controller according to this system program. A RAM 13 stores temporary computational data, display data, and data of various types inputted by an operator via a display/manual input means unit 20 comprising a display composed of a CRT or liquid crystals and manual input means comprising a keyboard. A CMOS memory 14 is backed up by a battery (not shown in the figure) and configured as a nonvolatile memory maintaining the storage state even when the power source of the controller 10 is off. The CMOS memory 14 stores a machining program read via an interface 15 and a machining program inputted via the display/manual input means unit 20. Furthermore, a variety of system programs have been stored in advance in the ROM 12.

The interface 15 enables the external devices to be connected to the controller 10. A PMC (programmable machine controller) 16 outputs signals via an I/O unit 17 to an auxiliary device (for example, an actuator of a tool replacement unit) of the machine tool, which is the control object, by means of a system program contained in the controller 10 and also receives signals, e.g., of a variety of switches located on a control panel disposed on the main body of the tool machine, which is the control object to be controlled by the controller 10, conducts the necessary signal processing, and transfers the processing results to the CPU 11.

Axis control circuits 30-32 of each axis (X, Y, Z axes) receives movement commands for each axis from the CPU 11 and outputs those movement commands to respective servo amplifiers 40-42. The servo amplifiers 40-42 receive those commands and driver servo motors 50-52 of the driven body of each axis of the machine (control object). The servo motors 50-52 of individual axes contain position/speed detectors 70-72, the position and speed signals from the position/speed detectors 70-72 are fed back by to the axis control circuits 30-32, and feedback control of position/speed is conducted by the axis control circuits 30-32. Each of the axis control circuits 30-32 comprise a processor and a memory such as ROM or RAM, conduct feedback control of position, speed, and electric current, control the position, speed, and electric current of servo motors 50-52 of each axis, and control the position and speed of driven bodies (works, table, tools, etc.) 60-62 driven by the axis servo motors 50-52. The position/speed detectors 70-72 may be provided on the driven bodies 60-62, rather than being attached to axis servo motors, to conduct direct detection and feedback of the position and speed of the driven bodies. Furthermore, in FIG. 1, the description of the control system for driving the spindle is omitted.

The above-described configurations are identical to those of the conventional numerical control apparatus and machines controlled by the numerical controllers. The difference between the present embodiment and the conventional numerical controllers is in that in the present embodiment acceleration detection means 80-82 are additionally installed at driven bodies (works, table, tools, etc.) of respective axes and the acceleration detection values that are detected by those acceleration detection means 80-82 are fed back to respective axis control circuits 30-32 and also in that the below-described control is conducted based on the fed-back acceleration detection values.

Figure 2:
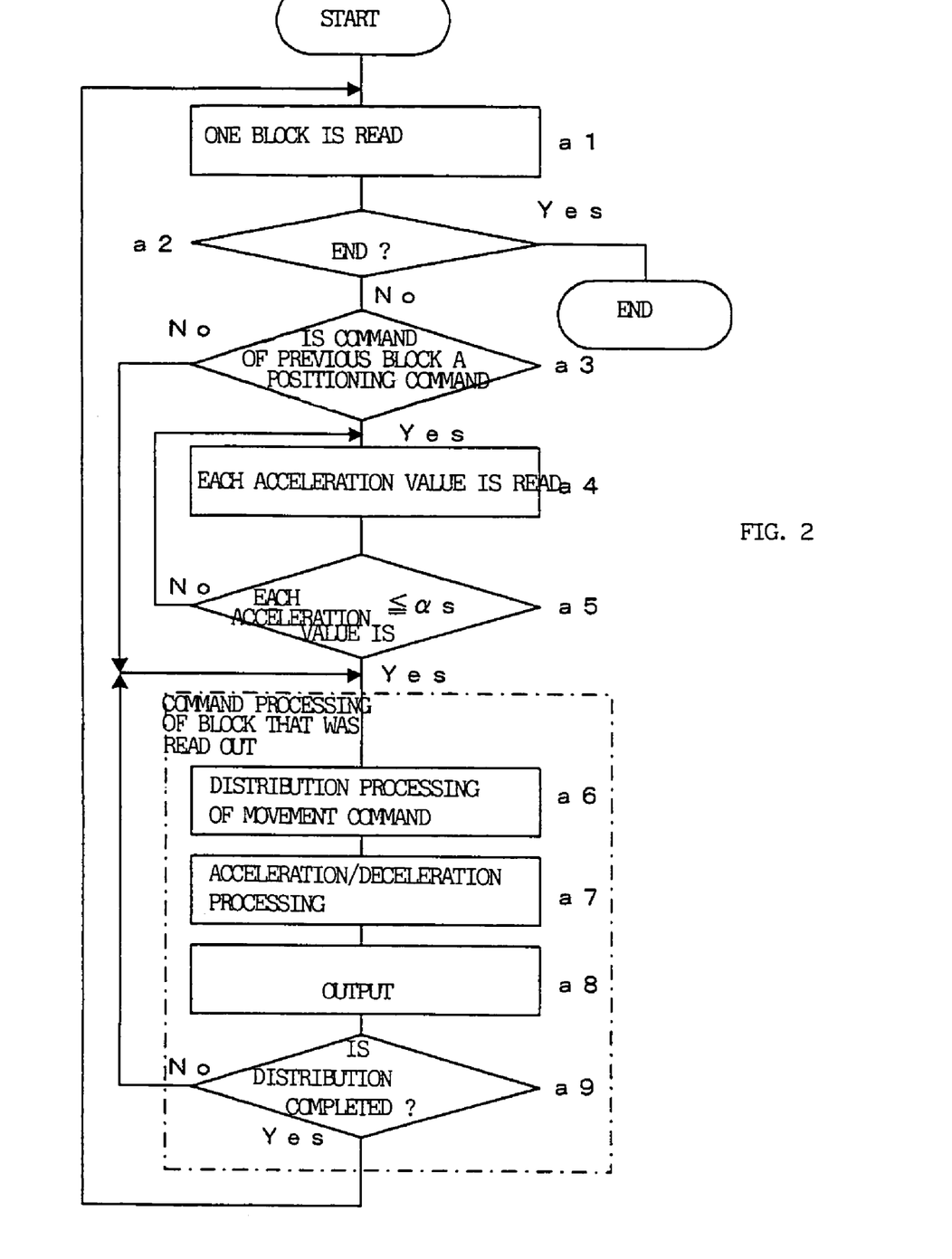
FIG. 2 is a flowchart of control processing executed by the controller (CPU of the controller shown in FIG. 1) in the first embodiment of the present invention.

FIG. 2 is a flowchart of the first mode of control processing executed by the CPU 11 of the controller 10 shown in FIG. 1. In the first mode, positioning of the driven bodies (works, table, tools, etc.) 60-62 is carried out, then whether the vibrations calmed down or not is determined with the acceleration detection means 80-82, and subsequent operations are carried out.

The CPU 11 reads a machining program, which was stored in advance in the CMOS memory 14, one block by one block from the head of the program (step a1), determines whether the command of the block that was read out is a program end command or not (step a2). And if not the program end command, the CPU 11 determines whether the command of the previous block is a positioning command or not (step a3). If it is not a positioning command, the processing proceeds to step a6, where the operations instructed by the block that was read out are executed (steps a6 to a8), and after the execution of the command in this block has been completed (step a9), the processing returns to step a1 and the CPU 11 reads and executes the next block.

In FIG. 2, the steps a6 to a9 correspond to execution processing of the block that was read out, but in the explanation of FIG. 2, main attention will be paid to the case where the command of the block is a movement command. Thus, in the case of a movement command, the distribution process of movement command to each axis is carried out based on the command of the block that was read out (step a6), acceleration/deceleration processing is conducted (step a7), and the results are outputted to axis control circuits 30-32 of each axis (step a8). Whether or not the distribution of movement command has been completed up to the position instructed by the block that was read out is then determined (step a9), the processing from step a6 to step a9 is repeatedly executed till the distribution is completed, and once the distribution is completed, the processing returns to step a1.

If the command of the block that was read out is not a movement command, the processing in steps a6 to a9 is changed to the processing of this command that was read out. For example, if the command of the block that was read out is a tool replacement command, then tool replacement processing is executed.

Thus, one block is read from the machining program, and the processing instructed by the block that was read out is executed. Once this execution is completed, the next block is read out and the processing of this block is executed.

On the other hand, when the command of the previous block was a positioning command in step a3, the processing proceeds to step a4 from step a3 and the CPU 11 reads the acceleration detection values that are detected by the acceleration detection means 80-82 mounted on the driven body (work, table, tool, etc.) for each axis via the axis control circuits 30-32 and fed back. Whether or not the detected values of acceleration for each axis are less than a threshold αs that was set in advance is then determined (step a5). The driven body is fed by a positioning operation, and after the distribution of movement command of this positioning feed has been completed, the driven body might vibrate. If the driven body vibrates, it means that the speed of the driven body changes and acceleration appears. Therefore, the detected value of acceleration detected by the acceleration detection means 80-82 is not "0" and assumes a certain value.

The acceleration detection values of the driven body for each axis that were detected by the acceleration detection means 80-82 are read and the system waits till each detected value of acceleration becomes equal to or less than the threshold αs. For example, if the threshold αs is taken as "0", a state in which each detected value of acceleration became "0" and the vibrations stopped completely can be detected. The processing of the command read out in step a1 is started after each detected value of acceleration has been confirmed to be equal to or less than the threshold.

Therefore, when a positioning operation is carried out and cutting feed is conducted, the distribution of the movement command of cutting feed is conducted for the first time after the distribution of the positioning command has been completed and each detected value of acceleration became equal to or less than the threshold αs. Therefore, the cutting feed is started after the vibrations of the driven body (work, table, tool, etc.) have calmed down.

As a result, highly accurate machining can be conducted and no useless waiting time is required. Furthermore, in the case of a tool replacement command, too, the tool replacement operation processing is started after the acceleration detection values became equal to or less than the threshold αs. Therefore, stable tool replacement is possible.

In the first mode (processing of FIG. 2), the processing in steps a4, a5 may be conducted only with respect to a certain operation command that requires the next operation to be started after the vibrations of the driven body stopped, such as a cutting feed or tool replacement command, after the positioning operation. In this case, a decision is made as to whether or not the command of the block that was read out following step a2 is a command requiring the vibration stoppage to be determined, and when the vibration stoppage is required to be determined, the processing proceeds to step a4, and if the vibration stoppage is not required to be determined, the processing proceeds to step a6.

Furthermore, the highest risk of vibrations being generated during the stoppage is when the positioning operation is conducted according to a fast feed command. Therefore, step a3 may be replaced with a step of determining whether the previous block is of a fast feed command or not, the processing in steps a4, a5 may be conducted only when the previous block is of a fast feed command, and whether the vibrations have stopped or not may be determined. Furthermore, because the vibrations occur when a feed operation is carried out at a high speed, only the detected value of acceleration for the axis with a fast feed in the previous block may be read and whether or not the detected value of acceleration is equal to or less than the threshold αs may be determined in steps a4, a5.

Figure 3:
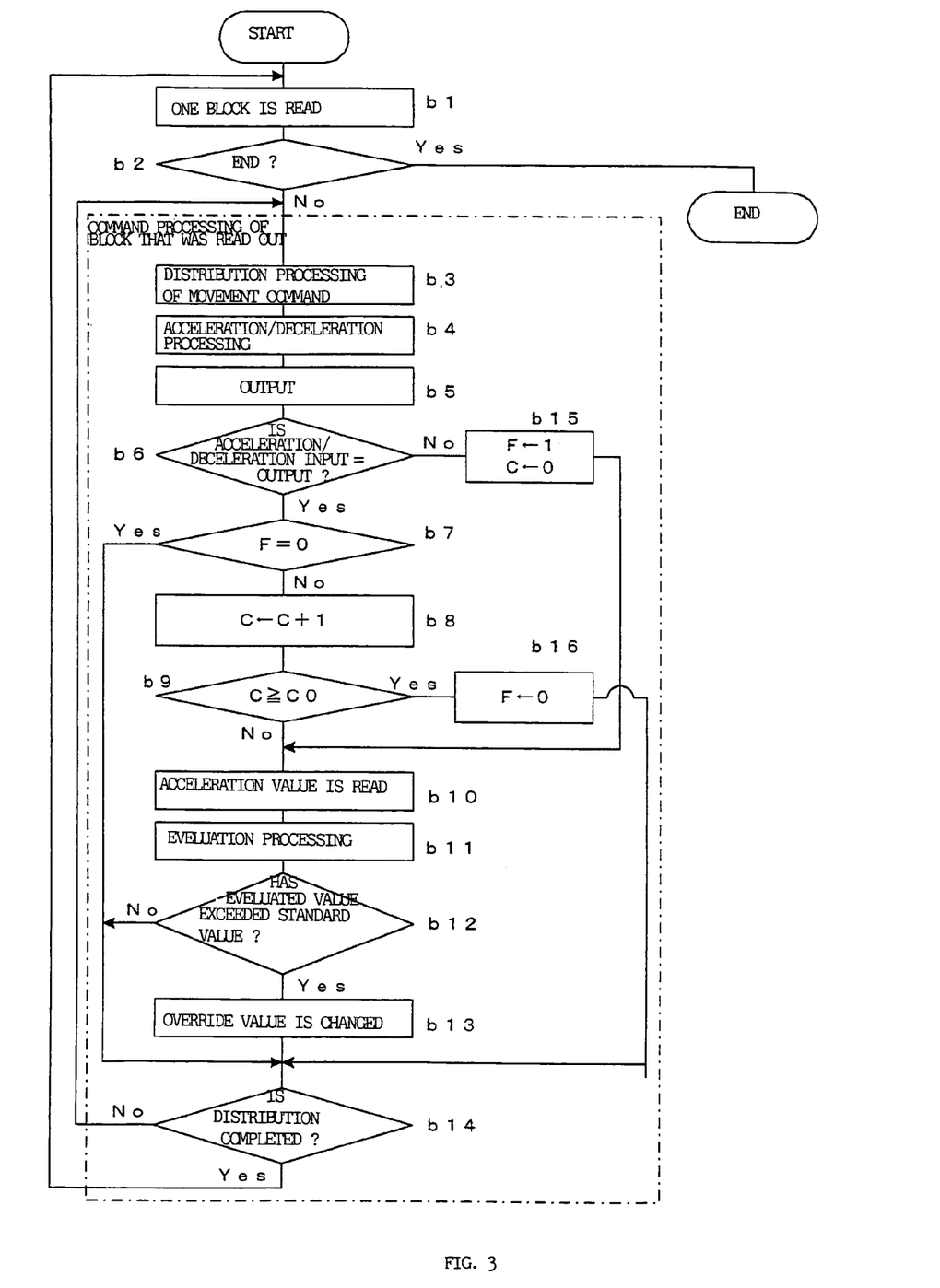
FIG. 3 is a flowchart of control processing executed by the controller (CPU of the controller shown in FIG. 1) in the second embodiment of the present invention.

FIG. 3 is a flowchart of the second mode of control processing executed by the CPU 11 of the controller 10 shown in FIG. 1. The specific feature of the second mode is that the occurrence of vibrations is monitored during the acceleration/deceleration of the driven body and within the prescribed time interval after the acceleration/deceleration.

The CPU 11 reads one block from the head of the machining program (step b1), determines whether the command of the block that was read out is a program end command or not (step b2), and if not the program end command, the CPU 11 executes the processing instructed by the block that was read out. In FIG. 3, too, the case where the command is a movement command will be mainly explained. In the case where the command that was read out is not a movement command, the processing of the command that was read out is executed in the conventional manner, instead of processing in steps b3 to b13, the end of this processing is determined in step b14, and after this processing has ended, the processing returns to step b1, as in the conventional processing. The case where the command that was read out is a movement command is described in detail with reference to FIG. 3, and the processing in the case of a movement command is different from the conventional processing.

If the command of the block that was read out is the movement command, the distribution processing of the movement command to each axis is started and the movement command subjected to acceleration/deceleration processing is outputted to axis control circuits 30-32 (steps b3 to b5). Then, the distributed command outputted to the acceleration/deceleration processing and the output after the acceleration/deceleration processing, that is, the input and output of the acceleration/deceleration processing are compared and whether they match or not is determined (step b6). If the input and output of the acceleration/deceleration processing do not match with each other, it means that the acceleration/deceleration processing is being carried out, and if they match, it means that the acceleration/deceleration processing has ended.

When the distribution of the movement command started, the input and output of the acceleration/deceleration processing do not match with each other and the acceleration/deceleration processing is being conducted. Therefore, the processing proceeds to step b15, a flag F indicating that an acceleration/deceleration value is being monitored is set to "1", a counter C that counts the time (number of distribution periods) after the acceleration/deceleration end is set to "0", the processing proceeds to step b10, the acceleration detection values detected by the axis acceleration detection means 80-82 are read, and the evaluation processing of the detected value of acceleration for each axis is conducted (step b11).

Averaging processing of various types is carried out as the evaluation processing. Whether or not all the evaluation values (average values of the acceleration detection values for each axis) exceed reference values that were set in advance is determined (step b12) and if the evaluation values for all the axes do not exceed the reference values, the processing proceeds to step b14. Furthermore, when the evaluation value for any axis exceeds the reference value, the acceleration is considered to be too large, vibrations are assumed to have occurred, an override value is reduced by the prescribed quantity (step b13), and the processing proceeds to step b14.

The distribution processing of movement command is executed by multiplying by an override value the speed commanded by the machining program. Therefore, if the override value is reduced by the prescribed quantity, the speed command value becomes lower than that of the program command and the distribution of the movement command is carried out correspondingly to this reduced speed.

In step b14, whether or not the distribution of the movement command of the block that was read out is completed or not is determined. If the distribution is not completed, the processing returns to step b3 and the above-described processing is executed. In the process of repeatedly executing the processing in steps b3 to b6, step b15, and steps b11 to b14 for each distribution period, if the acceleration/deceleration has ended and the input and output of the acceleration/deceleration processing became identical, then the processing proceeds from step b6 to step b7, and whether the flag F is "0" or not is determined. Because the flag F has been set to "1" in step b15, the processing proceeds to step b8, the counter C is incremented by "1", and whether or not the value of the counter C is equal to or higher than a set value C0 that was set in advance is determined. If the set value C0 has not been reached, the processing proceeds to step b10, and the above-described processing in step b10 and subsequent steps is conducted.

Then, the processing in step b3 to step b14 is carried out for each distribution period and if the value of the counter C is detected to become equal to or higher than the set value C0 in step b9, the flag F is set to "0" (step b16), and the processing proceeds to step b14. Then, the processing in step b3 to step b7 is conducted and because the flag F is "0", the processing proceeds from step b7 to step b14.

Furthermore, if deceleration started and the input and output of the acceleration/deceleration processing do not match each other in step b6, the processing proceeds from step b6 to step b15, the flag F is set to "1", and counter C is set to "0", and the monitoring and evaluation of the acceleration value are started as described here in above.

If the distribution of the movement command of the block that was read out is thus completed (step b11), the processing returns to step b1, the next block is read out, and the above-described processing in step b1 and subsequent steps is executed. During acceleration/deceleration and the prescribed time interval after the acceleration/deceleration, the detected value of acceleration detected by acceleration detection means 80-82 for each axis is read and evaluated and if the evaluated value exceeds the set reference value, the override value causes the command speed to be reduced by the prescribed quantity, with the result that the excess speed change is eliminated and the occurrence of vibrations can be prevented.

In the above-described second mode, the detected value of acceleration was evaluated in step b11 and step b12 and whether or not the vibrations have occurred was determined based on the evaluation results. However, the evaluation processing may be also conducted by determining whether or not the acceleration evaluation value that was detected in step b10 has exceeded the set reference value in step b12, without conducting evaluation processing in step b11.

Figure 4:
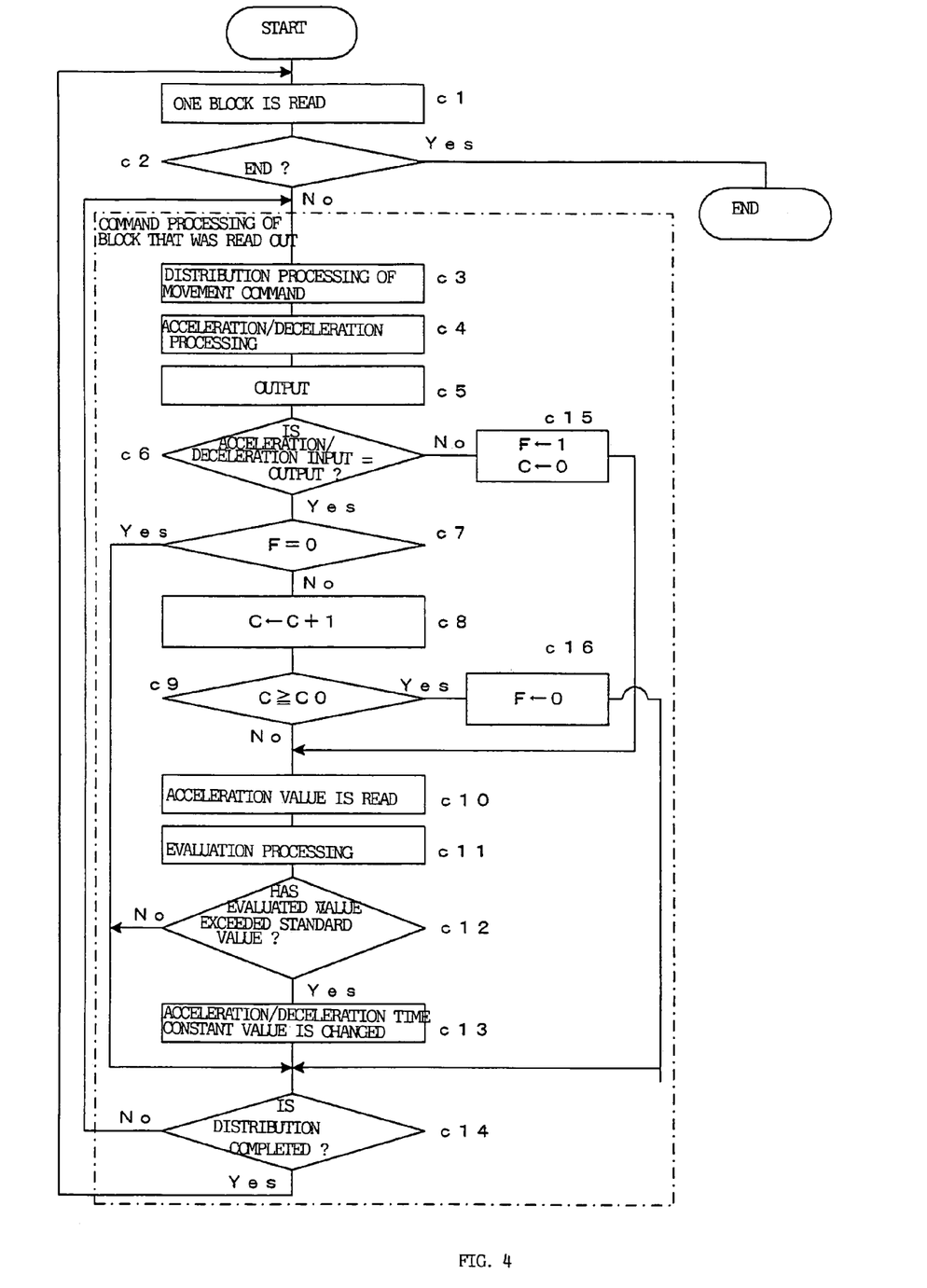
FIG. 4 is a flowchart of control processing executed by the controller (CPU of the controller shown in FIG. 1) in the third embodiment of the present invention.

FIG. 4 is a flowchart illustrating the third mode of control processing executed by the CPU 11 of the controller 10 shown in FIG. 1. The third mode is identical to the above-described second mode. However, in the second mode, the override value is changed, whereas in the third mode, the vibrations of the driven body are inhibited by changing the acceleration/deceleration time constant, that is, by changing the variation ratio of speed command.

Comparison of the flowchart of the second mode shown in FIG. 3 and the flowchart of the third mode shown in FIG. 4 demonstrates that steps b1 to b16 shown in FIG. 3 correspond to steps c1 to c16 shown in FIG. 4, but the processing in step b13 in FIG. 3 where "override value is changed" is replaced with the processing in step c13 shown in FIG. 4 where "acceleration/deceleration time is changed".

When the evaluated value of the detected value of acceleration exceeds the set reference value, the acceleration/deceleration time constant is changed (the time constant is increased by the prescribed quantity) so that speed variation is made smaller. The acceleration/deceleration processing in step c4 is executed at the acceleration/deceleration time constant that was set, but if the acceleration/deceleration time constant becomes variable, the acceleration/deceleration processing is executed with the acceleration/deceleration time constant that was varied. Therefore, if the acceleration/deceleration time constant increases by the prescribed quantity, the speed variation rate during acceleration and deceleration decreases and the change of speed is relaxed, thereby inhibiting vibrations.

In the above-described second and third embodiments, the acceleration value is read during acceleration/deceleration and within the prescribed set interval after the acceleration/deceleration, whether the reference value has been exceeded or not is determined based on the acceleration value that was read, and whether vibrations have occurred or not is determined, but reading the acceleration value and determining whether or not the vibrations have occurred may be carried out only within the prescribed set period from the start of acceleration/deceleration. In this case, as shown in FIG. 2 and FIG. 3, the processing in step b15 and step c15 is replaced with the processing of setting the flag F to "1" and incrementing the counter C by "1", and the processing in step b16 and step c16 is replaced with the processing of setting the flag F to "0" and setting the counter C to "0".

Thus, when the acceleration/deceleration starts, the input and output of acceleration/deceleration processing do not match each other. Therefore, the processing proceeds from steps b6, c6 to steps b15, c15, the processing of setting the flag F to "1" and incrementing the counter C by "1" is executed, and then the acceleration value is read and evaluated. Furthermore, if the value of counter C becomes equal to or higher than the set value C0, the flag F is set to "0" and the counter C is set to "0" in steps b16 and c16, and neither reading of the acceleration value nor evaluation thereof is executed. If deceleration starts and the input and output of acceleration/deceleration processing do not match each other, the processing of setting the flag F to "1" and incrementing the count of counter C is again executed in steps b15, c15, and the above-described operations of reading and evaluating the acceleration value are executed.

In the case where a section for counting up the counter C, reading the acceleration determination value, and determining whether vibrations have occurred or not is determined based on whether the counter value became equal to the prescribed value C0 or exceeded it, from the acceleration/deceleration start, when the acceleration/deceleration time constant shown in FIG. 4 is changed and increased, the acceleration/deceleration time is increased accordingly, so that the set value C0 is also increased in association with the increase of the acceleration/deceleration time constant.

Furthermore, the acceleration value may be read and whether vibrations have occurred or not may be determined at all times, and not only during acceleration or deceleration. In this case, as shown in flowchart in FIG. 3, processing in steps b6 to b9 and steps b15, b16 become unnecessary, and a processing may proceed from step b5 to step b10. Furthermore, in the flowchart shown in FIG. 4, processing in steps c6 to c9 and steps c15, c16 become unnecessary and processing may proceed from step c5 to step c10.

Figure 5:
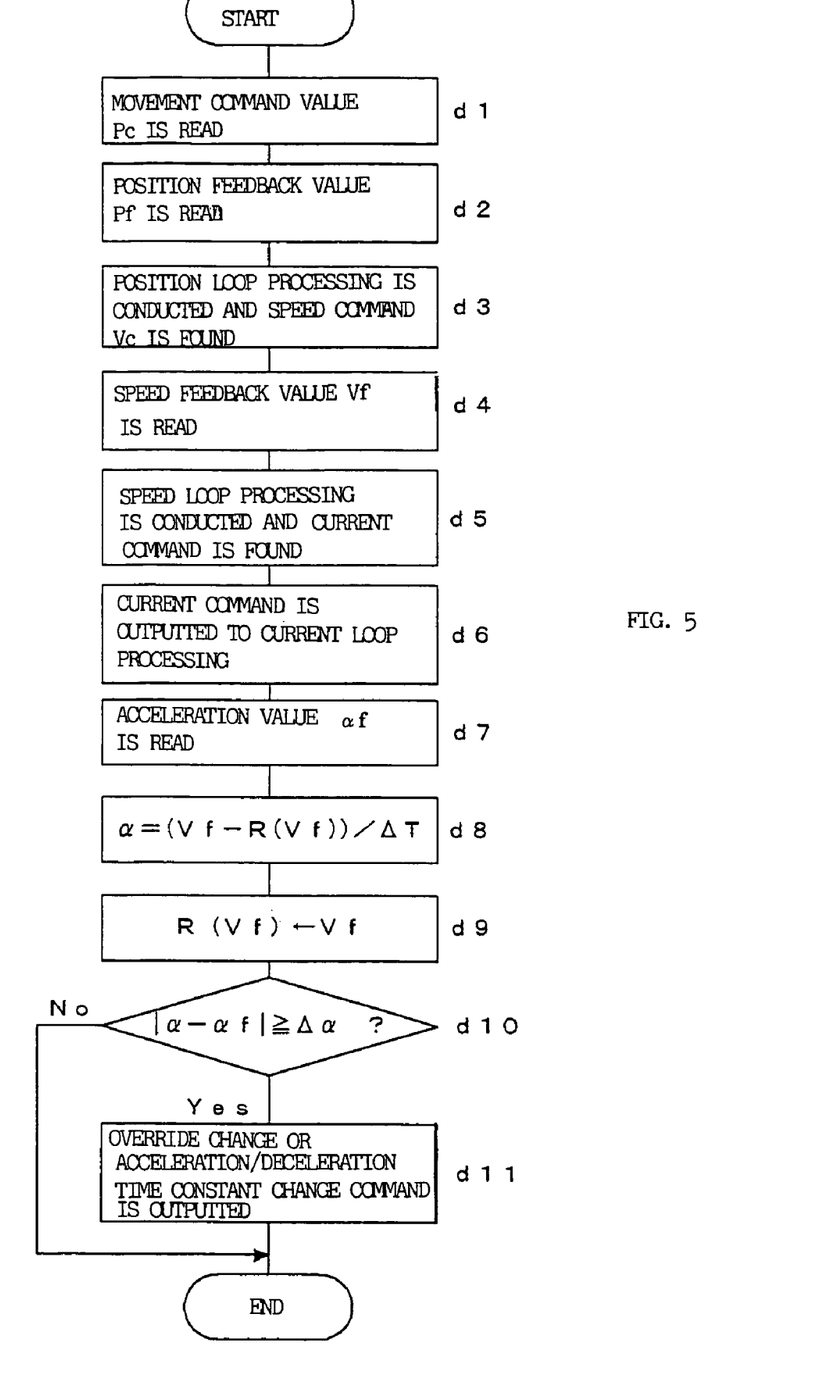
FIG. 5 is a flowchart of control processing executed by the controller (CPU of the controller shown in FIG. 1) in the fourth embodiment of the present invention.

FIG. 5 is a flowchart illustrating the fourth embodiment of control processing executed by the CPU 11 of the controller 10 shown in FIG. 1. In the fourth embodiment, the processors of axis control circuits 30-32 determine whether or not vibrations have occurred in the driven body which is driven by their own servo motors, and when the vibrations are determined to have occurred, a command to change the override or the acceleration/deceleration time constant is outputted to the numerical control unit (CPU 11), which distributes the movement commands.

The processors of axis control circuits 30-32 read a movement command value Pc from the CPU 11, which conducts the numerical control processing such as distribution processing of movement commands, read a position feedback value Pf from the position/speed detectors 70-72, conduct the position loop processing (position feedback processing) and find a speed command Vc (steps d1, d2, d3). Furthermore, a speed feedback value Vf from the position/speed detectors 70-72 is read, the speed loop processing (speed feedback processing) is conducted with this speed feedback value Vf and the speed command Vc, which was found, and a current command is found, and the current command is outputted for a current loop processing (steps d4, d5, d6). The processing of finding this current command and outputting it to the current loop processing is identical to the processing (position and speed loop processing) carried out with the conventional axis control circuits. The current loop processing is also identical to the conventional processing.

Then, the detected value of acceleration αf, which is the output of the acceleration detection means 80-82, is read and an estimated acceleration α is found by subtracting the speed feedback found in the previous period and stored in a register R (Vf) from the speed feedback value Vf found in step d4, and by dividing the result by the position/speed processing period ΔT (step d8). The speed Vf detected in the present period is stored in the register R (Vf) (step d9). Then, it is determined whether the absolute value of the difference between the estimated acceleration α found from the speed feedback and the detected value of acceleration αf detected with the acceleration detection means is equal to or higher than the prescribed set quantity Δα (step d10).

When the difference between the estimated acceleration α found from the speed feedback and the actual acceleration αf found with the acceleration detection means is larger than the set prescribed quantity Δα, it means that vibrations have occurred in the driven body, the effect of the vibrations is increased, and the difference between the estimated acceleration α and actual acceleration αf became large. At this time, the numerical control unit (CPU 11) is instructed to change the override value (to decrease the override value by the prescribed quantity) or to change the acceleration/deceleration time constant in the acceleration/deceleration processing (to increase the acceleration/deceleration time constant by the prescribed quantity) (step d11). The processors of axis control circuits 30-32 for each axis execute the above-described processing in steps d1 to d11 for each position and speed control processing period.

The CPU 11, which conducts the numerical control processing such as distribution processing of movement commands, receives the override value change command or acceleration/deceleration time constant change command from the axis control circuits 30-32 and conducts the distribution processing of movement command by decreasing the override value and decreasing the command speed, as described in the second and third embodiments (FIG. 3 and FIG. 4). Alternatively, the CPU 11 increases the acceleration/deceleration time constant of acceleration/deceleration processing and decreases the speed variation ratio during acceleration and deceleration. As a result, the variation of speed is decreased and, therefore, the vibrations of the driven body are inhibited.

In the fourth embodiment, the estimated acceleration α is obtained on the basis of the speed feedback Vf, however it can also be obtained on the basis of the position feedback Pf. This is shown in the flowchart in FIG. 6, as the fifth embodiment.

Figure 6:
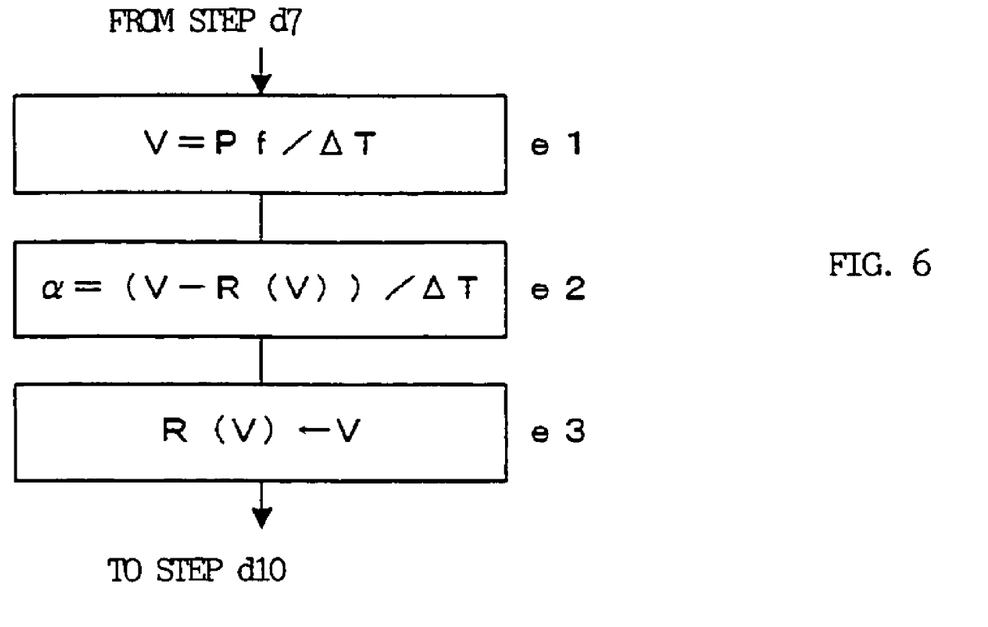
FIG. 6 is a flowchart of control processing executed by the controller (CPU of the controller shown in FIG. 1) in the fifth embodiment of the present invention.

In this embodiment, the processing in steps d1 to d7 shown in FIG. 5 is conducted, the position feedback quantity Pf in the present period is divided by the position-speed processing period ΔT to estimate the speed V in the present period (step e1), the estimated speed of the previous period that was found in the previous period and stored in the register R(V) is subtracted from this estimated speed V, and the difference obtained is divided by the position-speed processing period ΔT to find the estimated acceleration α(step e2). The estimated speed V found in step e1 of the present period is then stored in the register R (V), and the processing returns to step d10 of FIG. 5.

The processing in steps d1 to d7 shown in FIG. 5, steps e1 to e3 shown in FIG. 6, and steps d10, d11 shown in FIG. 5 is then repeatedly executed for each position-speed control processing period.

In the fourth and fifth embodiment, the estimated acceleration α is found from the speed feedback Vf and position feedback Pf, but the estimated acceleration α may be also found from the present period and previous period of speed command Vc and also the estimated acceleration α may be found by using the position command Pc instead of the position feedback Pf.

The controllers of the above-described embodiments are explained based on examples of controlling the position and speed of driven bodies 60-62 (or servo motors 50-52), but the present invention is also applicable to a controller which carries out position control only or speed control only.

What is claimed is:

1. A controller of a machining tool for controlling the position and/or speed of a driven body, comprising:
   detection means for detecting the position and/or speed of the driven body;
   acceleration detection means for detecting the acceleration of the driven body; and
   a stoppage determination processing unit for determining the stoppage of the driven body based on a detected value of acceleration detected by the acceleration detection means after completion of a positioning command to the driven body, wherein
   operation processing of the next command is carried out after the stoppage has been determined in the stoppage determination processing unit,
   wherein the positioning command to the driven body is taken as a positioning command based on a fast feed command, and the stoppage determination processing unit determines the stoppage of the driven body based on the detected value of acceleration detected by the acceleration detection means only after the fast feed command completion.

2. The controller according to claim 1, wherein the stoppage determination processing unit determines the stoppage when the absolute value of the detected value of acceleration becomes equal to or less than a preset value.

3. The controller according to claim 1, wherein the operation processing of the next command is an operation for cutting.

4. The controller according to claim 1, wherein the operation processing of the next command is an operation for cutting tool replacement.

5. A controller of a machining tool which has detection means for detecting the position and/or speed of a driven body and controls the position and/or speed of the driven body, comprising:
   acceleration detection means for detecting the acceleration of the driven body;
   an evaluation processing unit for conducting prescribed calculations for evaluating the vibration state of the driven body during acceleration or deceleration and within the preset time interval after the end of the acceleration or deceleration on the basis of the acceleration detected by the acceleration detection means; and
   change means for decreasing the variation ratio of a speed command to the driven body based on the evaluation value calculated by the evaluation processing unit.

6. A controller of a machining tool for controlling the position and/or speed of a driven body, comprising:
   detection means for detecting the position and/or speed of the driven body;
   acceleration detection means for detecting the acceleration of the driven body;
   an evaluation processing unit for conducting prescribed calculations for evaluating the vibration state of the driven body during a prescribed time interval that is set in advance from an acceleration or deceleration start; and
   change for decreasing the variation ratio of a speed command to the driven body based on the evaluation value calculated by the evaluation processing unit.

7. The controller according to claim 6, where the change means, when changing a time constant of the acceleration or deceleration, increases the prescribed time interval that is set from the start of the acceleration or deceleration in conjunction with increase in the time constant.

8. A controller of a machining tool for controlling the position and/or speed of a driven body, comprising:
   position/speed detection means for detecting the position and/or speed of the driven body;
   acceleration detection means for detecting the acceleration of the driven body; and
   acceleration estimation means for obtaining an acceleration estimation value based on the detection value from the position/speed detection means, wherein
   acceleration value estimated by the acceleration estimation means and the detected value of acceleration obtained from the acceleration detection means are compared with each other and, when the absolute value of the difference therebetween is equal to or larger than a preset threshold, the speed command or variation ratio of the speed command to the driven body is decreased.

9. The controller according to claim 8, wherein the acceleration estimation means obtains an acceleration estimation value based on a speed command value, instead of the detection value from the means for detecting the position or speed of the driven body.

10. A controller of a machining tool for controlling the position and/or speed of a driven body, comprising:
    detection means for detecting the position and/or speed of the driven body;
    acceleration detection means for detecting the acceleration of the driven body; and
    change means for decreasing the variation ratio of a speed command to the driven body when the detected value of acceleration detected by the acceleration detection means becomes equal to or greater than a preset threshold during a prescribed time interval that is set in advance from an acceleration or deceleration start.

11. A controller of a machining tool for controlling the position and/or speed of a driven body, comprising:
    detection means for detecting the position and/or speed of the driven body;
    acceleration detection means for detecting the acceleration of the driven body;
    an evaluation processing unit for conducting prescribed calculations for evaluating the vibration state of the driven body during acceleration or deceleration and within the preset time interval after the end of the acceleration or deceleration; and
    change means for decreasing a speed command to the driven body.

12. The controller according to claim 5, wherein the evaluation value to be calculated by said evaluation processing unit is an average value of the acceleration detection values for each axis.

* * * * *

UNITED STATES PATENT AND TRADEMARK OFFICE
CERTIFICATE OF CORRECTION

| | |
|---|---|
| PATENT NO. | : 7,657,356 B2 |
| APPLICATION NO. | : 11/289319 |
| DATED | : February 2, 2010 |
| INVENTOR(S) | : Yasusuke Iwashita et al. |

Page 1 of 1

It is certified that error appears in the above-identified patent and that said Letters Patent is hereby corrected as shown below:

Column 6, Line 64, change "bl3," to --b13,--.

Column 9, Line 42, change "bl6" to --b16--.

Column 12, Line 8, change "change" to --change means--.

Column 12, Line 25, before "acceleration" insert --the--.

Signed and Sealed this

Twentieth Day of April, 2010

David J. Kappos
*Director of the United States Patent and Trademark Office*